United States Patent
Jonasson et al.

(10) Patent No.: US 11,198,442 B2
(45) Date of Patent: Dec. 14, 2021

(54) METHOD AND SYSTEM FOR DETERMINING TIRE-TO-ROAD FRICTION IN A VEHICLE

(71) Applicant: Volvo Car Corporation, Gothenburg (SE)

(72) Inventors: Mats Jonasson, Partille (SE); Niklas Ohlsson, Gothenburg (SE); Srikar Muppirisetty, Mölndal (SE); Sohini Roy Chowdhury, Santa Clara, CA (US); Minming Zhao, Mountain View, CA (US)

(73) Assignee: Volvo Car Corporation, Gothenburg (SE)

( * ) Notice: Subject to any disclaimer, the term of this patent is extended or adjusted under 35 U.S.C. 154(b) by 218 days.

(21) Appl. No.: 16/420,553

(22) Filed: May 23, 2019

(65) Prior Publication Data

US 2019/0389475 A1 Dec. 26, 2019

Related U.S. Application Data

(60) Provisional application No. 62/687,858, filed on Jun. 21, 2018.

(30) Foreign Application Priority Data

Jun. 29, 2018 (EP) .................................... 18180900

(51) Int. Cl.
*B60W 40/12* (2012.01)
*B60C 11/24* (2006.01)
(Continued)

(52) U.S. Cl.
CPC ........... *B60W 40/12* (2013.01); *B60C 11/246* (2013.01); *B60W 40/068* (2013.01);
(Continued)

(58) Field of Classification Search
CPC .... B60W 40/12; B60W 40/068; B60W 50/14; B60W 2552/40; B60W 2556/45;
(Continued)

(56) References Cited

U.S. PATENT DOCUMENTS

| 10,814,846 B2 * | 10/2020 | Falconer ................. B60T 8/175 |
| 2007/0016354 A1 * | 1/2007 | Engel ...................... B60T 8/172 |
| | | 701/80 |

(Continued)

FOREIGN PATENT DOCUMENTS

| CA | 3006661 A1 | 6/2017 |
| CN | 104648049 A | 5/2015 |

(Continued)

OTHER PUBLICATIONS

Jan. 9, 2019 European Search Report issue on International Application No. EP18180900.

(Continued)

*Primary Examiner* — Hunter B Lonsberry
*Assistant Examiner* — Jay Khandpur
(74) *Attorney, Agent, or Firm* — Clements Bernard Walker; Christopher L. Bernard

(57) ABSTRACT

A method for estimating a tire property of a vehicle based on tire-to-road friction properties for a fleet of vehicles. The method includes: determining a tire-to-road friction for a plurality of vehicles, belonging to the fleet of vehicles, at a plurality of specified locations; determining a reference tire-to-road friction for the fleet of vehicles at each specified location; in a vehicle, determining a current tire-to-road friction at a first location being one of the specified locations; determining a difference between the current tire-to-road friction and the reference tire-to-road friction of the fleet for the first location; and estimating a tire property of the vehicle based on the determined difference. There is also (Continued)

provided a system configured to perform the described method.

14 Claims, 3 Drawing Sheets

(51) Int. Cl.
| | | |
|---|---|---|
| *B60W 40/068* | (2012.01) | |
| *B60W 50/14* | (2020.01) | |
| *B62D 15/02* | (2006.01) | |
| *G01N 19/02* | (2006.01) | |
| *G07C 5/00* | (2006.01) | |
| *G07C 5/08* | (2006.01) | |
| *B60T 8/56* | (2006.01) | |
| *B60T 8/1763* | (2006.01) | |

(52) U.S. Cl.
CPC ........... *B60W 50/14* (2013.01); *B62D 15/029* (2013.01); *G01N 19/02* (2013.01); *G07C 5/008* (2013.01); *G07C 5/0808* (2013.01); *B60T 8/1763* (2013.01); *B60T 8/56* (2013.01); *B60W 2552/40* (2020.02); *B60W 2555/20* (2020.02); *B60W 2556/45* (2020.02)

(58) Field of Classification Search
CPC ............. B60W 2555/20; B60C 11/246; B62D 15/029; G01N 19/02; G07C 5/008; G07C 5/0808; B60T 8/56; B60T 8/1763
See application file for complete search history.

(56) References Cited

U.S. PATENT DOCUMENTS

| | | |
|---|---|---|
| 2015/0135800 A1 | 5/2015 | Israelsson |
| 2016/0133131 A1* | 5/2016 | Grimm ............ G08G 1/096725 |
| | | 701/117 |
| 2018/0037234 A1 | 2/2018 | Hoedt et al. |

FOREIGN PATENT DOCUMENTS

| | | | |
|---|---|---|---|
| DE | 102015119495 A1 | 5/2016 | |
| DE | 102016220692 A1 | 4/2018 | |
| EP | 1150266 A2 | 10/2001 | |
| EP | 1964736 A1 * | 9/2008 | ............. B60T 8/172 |
| EP | 2172377 A1 | 4/2010 | |
| EP | 2876413 A1 | 5/2015 | |
| EP | 2927065 A1 | 10/2015 | |
| EP | 3299993 A1 | 3/2018 | |
| JP | 2008031945 A * | 2/2008 | |
| WO | WO-2015074744 A1 * | 5/2015 | .......... B60W 40/068 |
| WO | 2017100797 A1 | 6/2017 | |

OTHER PUBLICATIONS

First office action and search report issued in the corresponding CN application No. 201910504551.4.

* cited by examiner

METHOD AND SYSTEM FOR DETERMINING TIRE-TO-ROAD FRICTION IN A VEHICLE

CROSS-REFERENCE TO RELATED APPLICATIONS

The present disclosure claims the benefit of priority of U.S. Provisional Patent Application No. 62/687,858, filed on Jun. 21, 2018, and entitled "METHOD AND SYSTEM FOR DETERMINING TIRE-TO-ROAD FRICTION IN A VEHICLE," and European Patent Application No. 18180900.5, filed on Jun. 29, 2018, and entitled "METHOD AND SYSTEM FOR DETERMINING TIRE-TO-ROAD FRICTION IN A VEHICLE," the contents of both of which are incorporated in full by reference herein.

TECHNICAL FIELD

The present invention relates to a method and a system for determining a tire-to-road friction for a vehicle. Furthermore, the invention relates to a method for determining the friction properties of a tire of a vehicle.

BACKGROUND

Active safety is becoming more advanced in today's vehicles as the automotive technology is evolving. For example, most new vehicles are equipped with active safety in the form of the well known ABS brake system which allows a more controlled braking action for the driver of the vehicle.

In a driving situation with a vehicle, the friction between the road and the tire is of high importance since it stipulates the amount of force that can be transferred from the vehicle to the ground. Thus, the friction is an important parameter for active safety systems when decisions have to be taken related to for example braking and steering with the vehicle. This is relevant both for manually driven vehicles and for autonomous vehicles.

Moreover, for semi- or fully autonomous vehicles, there are additional systems relying on accurate and reliable friction estimation for proper operation. Such systems may for example include curve handling systems.

However, in a tire-to-road friction measurement, the resulting tire-to-road friction is obviously a result of the properties of both the tire and the road, and a low friction may be the result of either a low friction coefficient of the road or a worn tire having reduced friction.

Accordingly, there is a need for further refined methods and system for determining a tire-to-road friction in a vehicle.

SUMMARY

In view of the above-mentioned and other drawbacks of the prior art, it is an object of the present invention to provide a method for determining a tire property in a vehicle using tire-to-road friction measurements.

According to a first aspect of the invention, there is provided a method for estimating a tire property of a vehicle based on tire-to-road friction properties for a fleet of vehicles. The method includes: determining a tire-to-road friction for plurality of vehicles at a plurality of specified locations; determining a reference tire-to-road friction for the fleet of vehicles at each of the plurality of specified locations; in a vehicle, determine a current tire-to-road friction at a first location being one of the plurality of specified locations as a weighted average of friction values determined at the respective specified location; determining a difference between the current tire-to-road friction and the reference tire-to-road friction of the fleet for the first location; and estimating a tire property of the vehicle based on the difference.

The fleet of vehicles can be assumed to include vehicles being sufficiently similar so as to make the tire-to-road friction determinations for the vehicle comparable within the fleet. It is also possible that the fleet management system knows the tire type for each vehicle in the fleet, and that a reference friction is determined for a particular tire type so that comparisons between a current tire-to-road friction and a reference friction is performed for the same tire type.

In a typical tire-to-road friction determination in a vehicle, it is the observable friction that is estimated and reported, meaning that it is the combined friction of the tire and the road surface at the specific location of the friction measurement. Other cars in the fleet may then use the determined friction. Commonly, an underlying assumption is that the observable friction is treated as the friction of the road. The assumption is based upon the assumption that an attribute of the road varies much more than the tires e.g. an assumption that all cars have the same tire. A general problem is thus that friction estimation does not distinguish between the road and tire. Thereby, cars with abnormal tires will report the wrong friction to the fleet management system, e.g. a car with bad tires will typically report low friction which could cause false warnings of low friction to other cars in the fleet. High frequency of false warning gives less confidence in the system, which increases the risk of an accident. Moreover, when an individual car is estimating a low friction, it is unknown if the tire is bad or if the road is slippery. As a consequence, a driver cannot be warned that the tires are bad when the friction is low. If the tires of the vehicle are bad, the driver needs a notification that they should be replaced, else the risk of accident is increased.

Accordingly, the present invention is based on the realization that a friction estimation for the tire alone, independent of the road properties, can be achieved by comparing a current tire-to-road friction with a reference friction for the fleet, thereby providing an estimation of the quality of the tire of the vehicle.

The difference between the current tire-to-road friction and the reference friction can be seen as a direct estimate of the tire quality, where a current tire-to-road friction lower than the reference friction is an indication that the tire is worse than an average tire in the fleet.

The reference tire-to-road friction at a specified location is determined as a weighted average of a plurality of determined tire-to-road frictions at the specified location. Thereby, the reference friction value can selectively be made more reliable since selected friction values, times or locations can be given a lower or higher weight.

According to one embodiment of the invention, the method may further include, if the current tire-to-road friction is lower than the reference friction by more than a predetermined amount, providing an indication to a driver to control the tire. The indication may be provided as a visual or audible indication, or as a combination thereof. The indication may also vary based on how large the difference is, where the intensity of an alert may be proportionally increased with increasing difference.

According to one embodiment of the invention, the method may further include determining that the current tire-to-road friction is lower than the reference friction by more than a predetermined amount for at least a predetermined number of friction determinations within a predetermined period of time before providing an indication to a driver to control the tire. Thereby, it is not sufficient to use one single measurement for determining that the tire needs to be controlled. A deviating measurement result indicating a low tire friction may be due to several different reasons, e.g. based on unforeseen road properties such as a patch of ice, rain, wet leaves or any other condition rapidly influencing the road condition. Thereby, a more reliable estimation of the tire property is achieved.

According to one embodiment of the invention, the method may further include, if the current tire-to-road friction is lower than the reference friction by more than a predetermined amount, providing tire-to-road friction information to a vehicle control system to modify a vehicle behavior based on the current tire-to-road friction. Thereby, vehicle control systems can be alerted of a reduced friction, even if the difference does not exceed the predetermined amount. This allows the vehicle control systems to modify the behavior of the vehicle based on a suspected wear of the tire. This may for example have the effect that a vehicle speed through road curves is reduced compared to the case when the tires exhibit a normal friction.

According to one embodiment of the invention, determining a tire-to-road friction for a vehicle further includes determining a confidence value of the determined tire-to-road friction and wherein a weight used to determine the reference friction is based on the confidence value for each determined tire-to-road friction. A confidence value should be seen as a measure of how certain it is that the determined friction value corresponds to the true friction value. Accordingly, a high confidence value indicates that the friction value can be relied upon to accurately reflect the true friction whereas a low confidence value means that the determined friction may deviate from an actual friction.

According to one embodiment of the invention, the confidence value may be based on a quality of input signals provided to a friction estimator function in a vehicle. The friction estimation in a vehicle most commonly takes place in a control unit of the vehicle based on signals received from in-vehicle sensors. The sensor signals represent one or more physical parameters required for determining the tire-to-road friction, and the quality of the signals may vary. It may for example be the case that sensor signals from some sensor type are less reliable under certain conditions, leading to a lower confidence for a friction value measured under such conditions. Other factors which may influence the confidence value may be the noise properties of the signals and/or the quality of analog-to-digital conversion of the signals, since the control unit determining the friction can be assumed to be a digital circuit.

According to one embodiment of the invention, determining the confidence value includes evaluating if temperature and/or weather conditions are taken into account when determining the tire-to-road friction. If the vehicle performing the tire-to-road friction determination is known to take the temperature and/or weather conditions into account, it can be assumed that the friction value is more reliable, thereby having a higher confidence, compared to if environmental conditions are not taken into account. Additional factors which may influence the confidence of the friction measurement may include which method is used for determining the friction, if the vehicle brakes or accelerates during the friction measurement, and if so, how much the vehicle brakes/accelerates. Typically, a determination of the tire-to-road friction is more reliable when performed using a method requiring that the vehicle is either braking or accelerating, thereby improving the confidence in the friction value.

According to one embodiment of the invention, the specified location covers a predetermined area, and wherein it is assumed that road conditions are the same within the predetermined area. Thereby, one reference tire-to-road friction value can be assumed to be valid for the entire area, and the entire area can be treated as one location when determining the reference tire-to-road friction.

According to one embodiment of the invention, the method may further include modifying an area of a specified location if an average determined tire-to-road friction for a portion of the area differs from an average tire-to-road friction for the whole are by more than a predetermined amount. Thereby, local changes in road conditions can be accounted for by modifying the area defining a specified location, possibly by creating a new specified location defined by a subarea of the original area. However, the difference must exceed a certain threshold value to avoid that the areas become unreasonably small. It may also be required that the observed difference persists for a certain period of time and/or for a certain number of reported current tire-to-road frictions before modifying the original area.

According to one embodiment of the invention the method may further include defining a specified location by clustering tire-to-road friction values based on geographic location and friction value to derive regions so that each specified location is defined by an area exhibiting the same tire-to road friction. Thereby, a plurality of specified locations in a area of interest can be automatically generated by the described clustering method. The described clustering can be performed during an initial training phase or it can be performed continuously while the described method is used for a fleet of vehicles.

According to one embodiment of the invention, the method may further include updating the reference tire-to-road friction by discarding older tire-to-road friction determinations acquired before a predetermined point in time, thereby accounting for changing road conditions. Thereby, the reference friction is kept up to date based on recent road conditions as older values are discarded. It may also be possible to scale tire-to-road friction determinations with a weight which is decreasing with increasing age of the friction measurement, thereby gradually reducing the influence of older friction values in the determination of the reference friction. This can account for changing road condition due to e.g. weather changes.

According to one embodiment of the invention determining a reference tire-to-road friction may include excluding determined tire-to-road frictions below a predetermined threshold value. Thereby, the influence from low-friction tires is reduced since the purpose of the reference value is to provide a measure of a tire-to-road friction for a "normal" tire without excessive wear or damage. By excluding determined tire-to-road friction values below a predetermined threshold value, also transient and temporary changes in road conditions can also be excluded from the reference value for a given location.

According to one embodiment of the invention, determining a tire-to-road friction for one vehicle at one location includes individually determining a tire-to-road friction for each of four tires of the vehicle. Thereby, it is for example possible to estimate if one of the tires sees excessive wear and wears faster than the other tires. However, it equally possible to make the tire-to-road friction estimation for only two tires of the vehicle, preferably for the tires with the fastest wear.

According to a second aspect of the invention, there is provided a system for determining a tire property of a vehicle based on tire-to-road friction properties for a fleet of vehicles. The system includes a remote server in communication with each vehicle of a plurality of vehicles forming a fleet of vehicles, each vehicle including a tire-to-road friction determination control unit configured to determine a current tire-to-road friction when the vehicle is at one of a plurality of specified locations, the remote server being configured to receive the determined tire-to-road frictions from the plurality of vehicles and to determine a reference tire-to-road friction for the fleet at each specified location; and a vehicle configured to determine a difference between the current tire-to-road friction and the reference tire-to-road friction of the fleet for the first location; and to estimate a tire property of the vehicle based on the difference.

Effects and features of the second aspect of the invention are largely analogous to those described above in connection with the first aspect of the invention.

Further features of, and advantages with, the present invention will become apparent when studying the appended claims and the following description. The skilled person will realize that different features of the present invention may be combined to create embodiments other than those described in the following, without departing from the scope of the present invention.

BRIEF DESCRIPTION OF THE DRAWINGS

These and other aspects of the present invention will now be described in more detail, with reference to the appended drawings showing an example embodiment of the invention, wherein.

DESCRIPTION OF EMBODIMENTS

Figure 1:
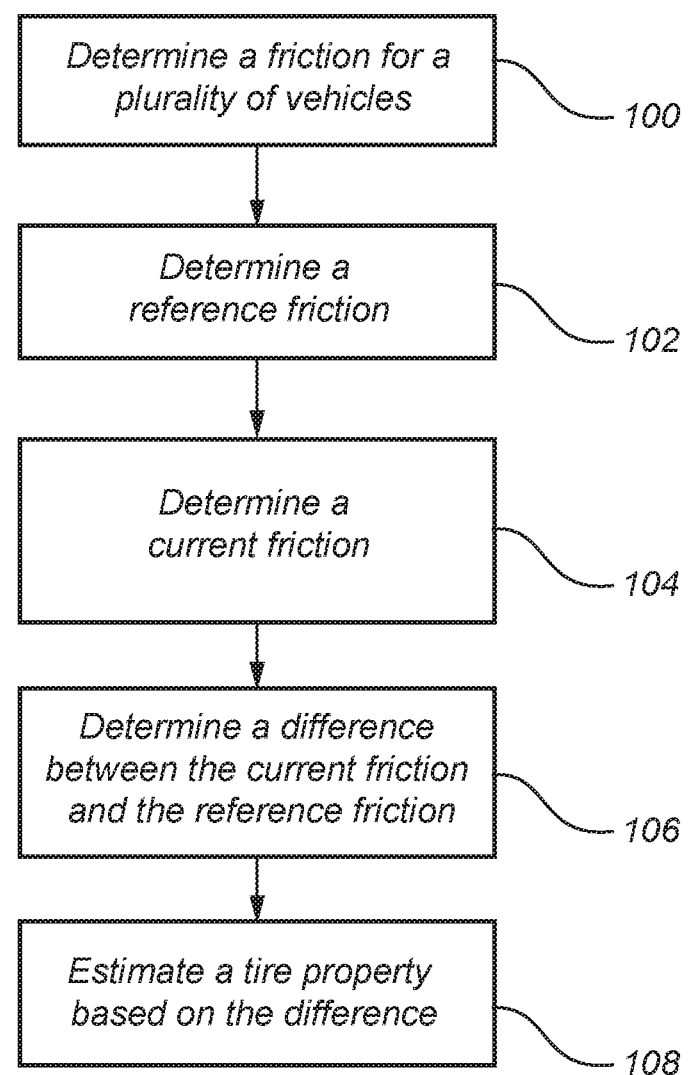
FIG. 1 is a flow chart outlining general steps of a method according to an embodiment of the invention.

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled person. Like reference characters refer to like elements throughout.

Figure 2:
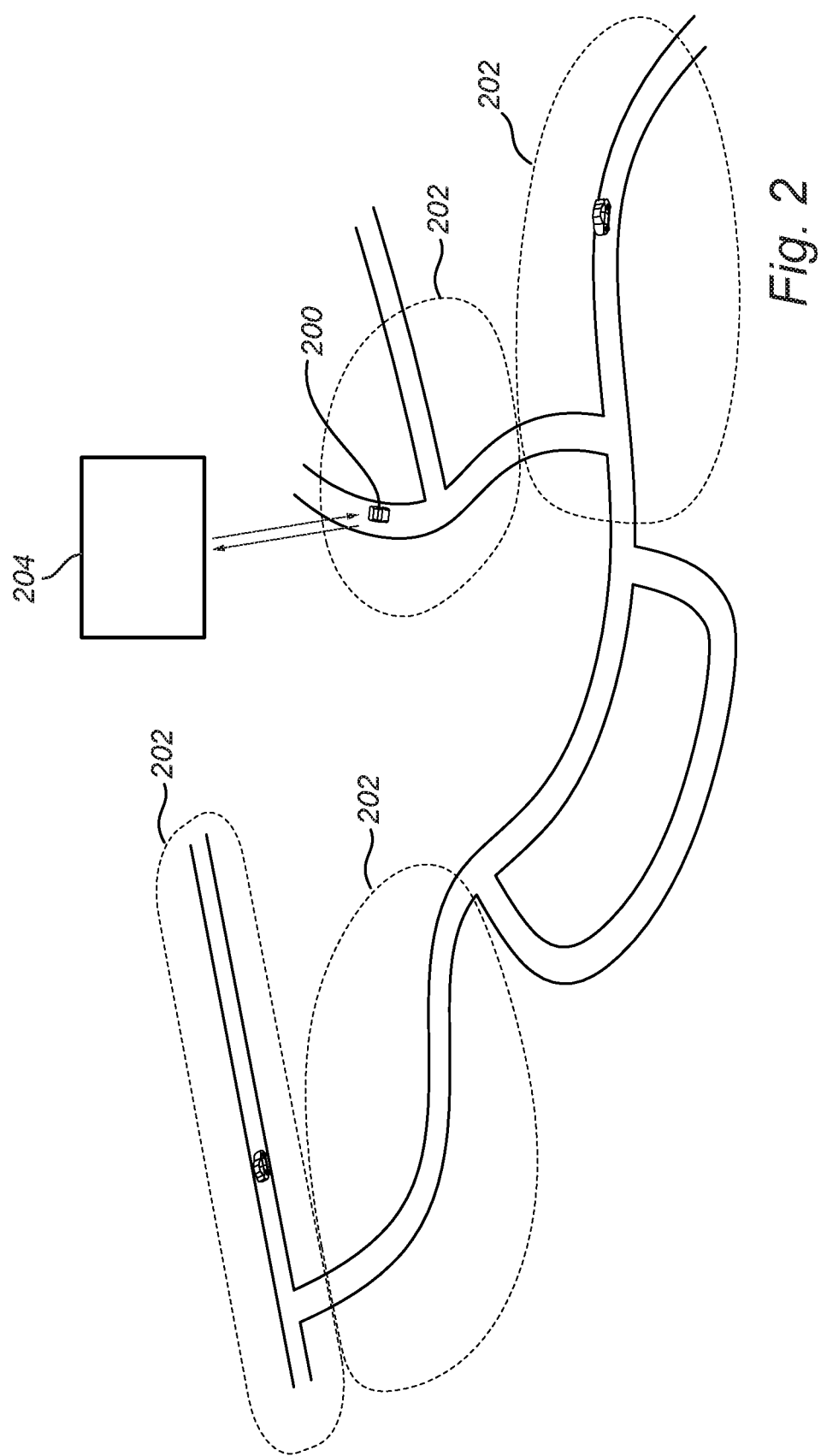
FIG. 2 schematically illustrates a method according to an embodiment of the invention.

FIG. 1 is a flow chart outlining general steps of a method according to an embodiment of the invention, and the method will be described with further reference to FIG. 2 schematically illustrating parts of a system according to an embodiment of the invention.

The described method is applicable to a fleet of vehicles where all of the vehicles of the fleet are of similar type having similar tires. The method may for example be employed by a vehicle manufacturer, a transport company, or any other entity where the properties of the vehicles within the fleet can be assumed to be well known.

In a first step, a tire-to-road friction for a plurality of vehicles, belonging to the fleet of vehicles, is determined 100 at a plurality of specified locations. This can be performed during a training period where selected vehicles with known tire properties are driven through the range of locations of interest. It is also possible to perform the described step during normal operation of the vehicles. To determine a reliable reference friction, a minimum number of vehicles determining a number of friction values over a period of time may be required to be confident in the reference friction.

It should further be noted that location herein refers to an area where the road friction can be assumed to be the same for the entire area. Accordingly, adjacent roads may belong to different locations if different properties of two adjacent roads give rise to different friction. However, the method is equally well applicable in implementations where a specified location relates to a specific road feature such as road crossing, a bridge or the like.

The determined tire-to-road friction are provided from the vehicles to a central server 204, which may be a distributed cloud server or a central server, where a reference tire-to-road friction for the fleet of vehicles at each specified location is determined 102. The reference tire-to-road friction will thus reflect a "true" friction from a statistical perspective, i.e. a fleet's weighted tire attributes are used as a reference.

Next, in a vehicle 200, a current tire-to-road friction is determined 104 at a first location 202 being any one of the specified locations. The vehicle 200 may either request the reference friction value for the specified location 202 from the remote server 204, or the vehicle may have already received the reference friction value, for example when approaching or entering the specified location.

Once the current tire-to-road friction is determined, a difference between the current tire-to-road friction and the reference tire-to-road friction of the fleet for the first location is determined 106. Finally, a tire property of the vehicle is estimated 108 based on this difference. If the current friction value determined by the vehicle is higher than the reference friction value by more than a predetermined threshold value, it is assumed that the tire is in better condition than the average tire of the fleet and no further action is taken. If, however, the current friction value is lower than the reference friction value by more than a predetermined threshold value, the driver may be alerted that the tires need to be checked. The estimated tire property may thus consist of an indication of if the tire is above or below an average tire in the fleet of vehicles. The estimated tire property may also more specifically provide a measure of the amount of wear of the tire. A more precise determination of a tire property requires knowledge of the relation between such a tire property, e.g. wear, and the deviation of the tire-to-road friction from a reference friction. Such information may be gathered from the fleet of vehicles during use of the method to facilitate more specific estimation of the tire properties.

In one embodiment of the method, the friction is determined individually for two or more tires, in which case the driver may be alerted with an indication as to which specific tires require control. A determined current friction, which is significantly lower than the reference friction, may also trigger other actions in the vehicle, such as controlling the vehicle to reduce the speed in curves to account for reduced tire grip.

Moreover, the current vehicle to road friction value, along with the time that the value was acquired and the geographical coordinates of the vehicle, is also provided to the remote server so that the reference friction value can be updated with the latest friction value. The friction difference may also be reported to the remote server 204, or the difference in friction may be determined in the remote server based on the reported friction from the vehicle. Thereby, the remote server can also monitor the tire properties of the vehicle.

The reference friction $\mu_{ref}$ for a specified location and within a limited time period can be determined as $$\mu_{ref} = \sum_{i=1}^{n} w_i \mu_i$$

where n is the number of observations, i.e. the number of determined tire-to-road friction values for the specified location and $w_i$ is the corresponding weight of the friction value $\mu_i$. The weight may in turn be determined as a function of a confidence measure of each determined tire-to-road friction value as w=f(confidence) where the function f should grow monotonically, i.e. a higher confidence should always result in a higher weight, and the weights should be non-negative. The confidence value is a quality measure of the friction estimate from a friction estimator. The confidence may be represented by a number between 0 and 1, where 0 means no confidence, and 1 indicates full confidence. The confidence can thus be seen as the likelihood for the friction estimate to be equal to ground truth. The confidence value may for example be determined based on the sensor signal used to determine the friction in the vehicle. If the quality of sensor signals is low or if sensors providing the signals to the friction estimator in the vehicle have low confidence, it normally results in low confidence of the estimated friction. As an example, currently available physics-based models often rely on several in-car sensor signals as input for tire-to-road friction estimation. Since it is possible to measure the quality of the in-car signals, e.g. in terms of signal to noise ratio (SNR), a signal with low SNR will be more likely lead to a low confidence of the determined friction value.

A further example of a factor determining or influencing the confidence value is if a physical model is used to describe friction. Such a model may be configured to handle different instances, where some instances are more uncertain than others. An uncertain instance refers to a situation when the validity of the model is low and hence when the estimated friction will be uncertain, leading to a lower confidence value. As an example, the physics of the tyre is easier to model for low slip, i.e. high friction, meaning that when high slip is present there is a higher uncertainty. High slip is typically occurs when the vehicle exhibits high acceleration, and a low friction increases the slip even more, thereby representing an uncertain instance. Accordingly, if it is known that the vehicle is operated in a high slip condition, a high uncertainty can be expected, and hence, the confidence should be set low. Other instances where the confidence may be low includes extreme ambient temperatures, since the tyre characteristics is very temperature dependent and temperature dependence is difficult to model and therefore commonly neglected. A third example that may be difficult to account for is excessive variations in tyre pressure.

Figure 3:
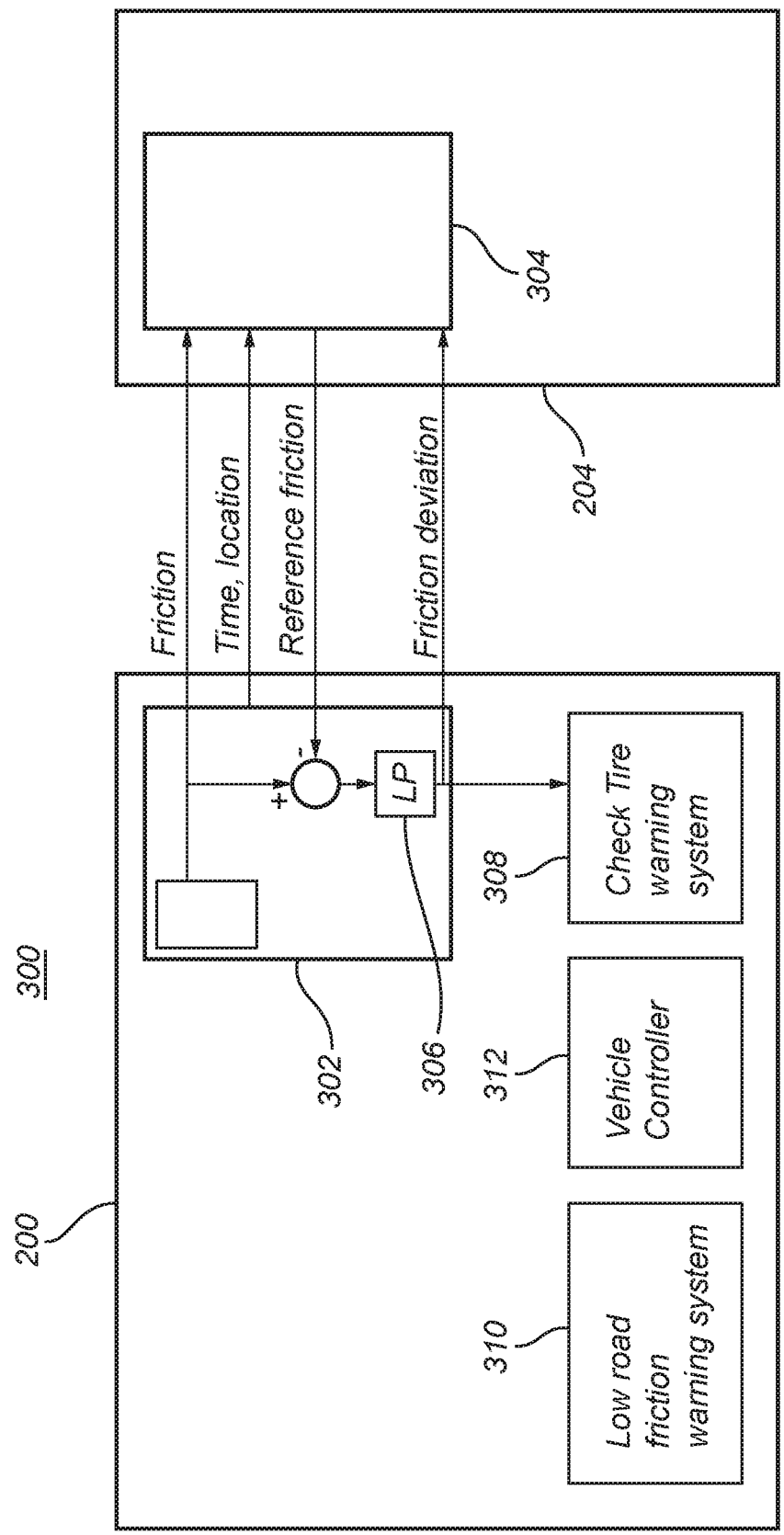
FIG. 3 schematically illustrates a system according to an embodiment of the invention.

FIG. 3 is a system 300 for determining a tire property of a vehicle based on tire-to-road friction properties for a fleet of vehicles according to an embodiment of the invention. The system includes a remote server 204 in communication with each vehicle of a plurality of vehicles forming a fleet of vehicles. Each vehicle includes a tire-to-road friction determination control unit 302 configured to determine a current tire-to-road friction when the vehicle is at one of a plurality of specified locations. The remote server includes a friction estimator 304 configured to receive the determined tire-to-road frictions from the plurality of vehicles and to determine a reference tire-to-road friction for the fleet at each specified location.

The system further includes a vehicle 200 including a friction determination control unit 302 configured to determine a difference between the current tire-to-road friction and the reference tire-to-road friction of the fleet for the first location; and to estimate a tire property of the vehicle based on the difference. The control unit may include a microprocessor, microcontroller, programmable digital signal processor or another programmable device. The control unit may also, or instead, include an application specific integrated circuit, a programmable gate array or programmable array logic, a programmable logic device, or a digital signal processor. Where the control unit includes a programmable device such as the microprocessor, microcontroller or programmable digital signal processor mentioned above, the processor may further include computer executable code that controls operation of the programmable device.

The friction determination control unit 302 further includes a low-pass filter 306 suppressing rapid changes in the determined friction. The vehicle further includes a "Check tire" warning system 308 and a "Low friction" warning system 310 coupled to an HMI (human-machine interface) of the vehicle 200 to provide warnings to the driver. Moreover, the vehicle 200 includes a vehicle controller 312 which takes the friction estimation as an input for potentially adapting the behavior of various vehicle systems based on the determined friction.

It should be noted that the described method is equally applicable to self-driving and fully or semi-autonomous vehicles where a correct estimation of the tire properties is important to be able to control the vehicle in a safe manner.

Even though the invention has been described with reference to specific exemplifying embodiments thereof, many different alterations, modifications and the like will become apparent for those skilled in the art. Also, it should be noted that parts of the method and system may be omitted, interchanged or arranged in various ways, the method and system yet being able to perform the functionality of the present invention.

Additionally, variations to the disclosed embodiments can be understood and effected by the skilled person in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage.

The invention claimed is:

1. A method for estimating a tire property of a vehicle based on tire-to-road friction properties for a fleet of vehicles, the method comprising:
   determining a tire-to-road friction for a plurality of vehicles, belonging to a fleet of vehicles, at a plurality of specified locations;
   determining a confidence value of each determined tire-to-road friction;
   determining a reference tire-to-road friction for the fleet of vehicles at each of the plurality of specified locations as a weighted average of friction values determined at the respective specified location, wherein the weighted average of friction values is based on the confidence value for each determined tire-to-road friction;

in a vehicle, determining a current tire-to-road friction at a first location being one of the plurality of specified locations;

determining a difference between the current tire-to-road friction determined in the vehicle and the reference tire-to-road friction determined for the fleet for the first location; and estimating a tire property of the vehicle based on the determined difference.

2. The method according to claim 1, further comprising, if the current tire-to-road friction is lower than the reference friction by more than a predetermined amount, providing an indication to a driver to control the tire.

3. The method according to claim 2, further comprising determining that the current tire-to-road friction is lower than the reference friction by more than a predetermined amount for at least a predetermined number of friction determinations within a predetermined period of time before providing an indication to a driver to control the tire.

4. The method according to claim 1, further comprising, if the current tire-to-road friction is lower than the reference friction by more than a predetermined amount, providing tire-to-road friction information to a vehicle control system to modify a vehicle behavior based on the current tire-to-road friction.

5. The method according to claim 1, wherein the confidence value is based on a quality of input signals provided to a friction estimator function in a vehicle.

6. The method according to claim 1, wherein determining the confidence value comprises evaluating if temperature and/or weather conditions are taken into account when determining the tire-to-road friction.

7. The method according to claim 1, wherein a specified location covers a predetermined area, and wherein it is assumed that road conditions are the same within the predetermined area.

8. The method according to claim 7, further comprising modifying an area of a specified location if an average determined tire-to-road friction for a portion of the area of the specified location differs from an average tire-to-road friction for the whole area of the specified location by more than a predetermined amount.

9. The method according to claim 1, further comprising defining a specified location by clustering tire-to-road friction values based on geographic location and friction value to derive regions so that each specified location is defined by an area exhibiting the same tire-to road friction.

10. The method according to claim 1, further comprising updating the reference tire-to-road friction by discarding older tire-to-road friction determinations acquired before a predetermined point in time, thereby accounting for changing road conditions.

11. The method according to claim 1, wherein determining a reference tire-to-road friction comprises excluding determined tire-to-road frictions below a predetermined threshold value.

12. The method according to claim 1, wherein determining a tire-to-road friction for one vehicle at one location comprises individually determining a tire-to-road friction for each of four tires of the vehicle.

13. A system for determining a tire property of a vehicle based on tire-to-road friction properties for a fleet of vehicles, the system comprising:

a remote server in communication with each vehicle of a plurality of vehicles forming a fleet of vehicles, each vehicle comprising a tire-to-road friction determination control unit configured to determine a current tire-to-road friction when the vehicle is at one of a plurality of specified locations, the remote server being configured to receive the determined tire-to-road frictions from the plurality of vehicles and to determine a reference tire-to-road friction as a weighted average of friction values determined at the respective specified location for the fleet at each specified location, wherein the weighted average is based on a confidence value for each determined current tire-to-road friction; and a vehicle configured to determine a difference between the current tire-to-road friction determined in the vehicle and the reference tire-to-road friction determined for the fleet for a first location; and to estimate a tire property of the vehicle based on the difference.

14. The system according to claim 13, wherein the remote server is further configured to define a specified location by clustering tire-to-road friction values based on geographic location and friction value to derive regions so that each specified location is defined by an area exhibiting the same tire-to-road friction.

* * * * *